Sept. 15, 1970          B. P. GOODMAN          3,528,868

METHOD FOR COATING THE STANDOFF AREA OF A THREADED COUPLING

Filed Feb. 13, 1967          2 Sheets-Sheet 1

Barnard P. Goodman
INVENTOR

BY Arnold, Roylance, Kruger & Durkee
ATTORNEYS

Sept. 15, 1970            B. P. GOODMAN            3,528,868
METHOD FOR COATING THE STANDOFF AREA OF A THREADED COUPLING
Filed Feb. 13, 1967            2 Sheets-Sheet 2
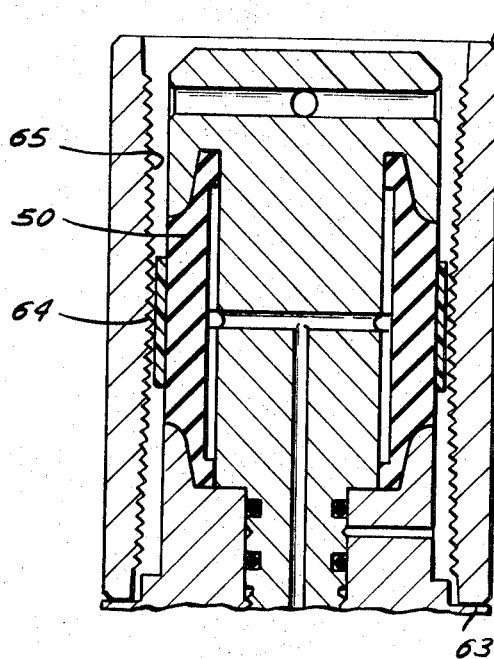
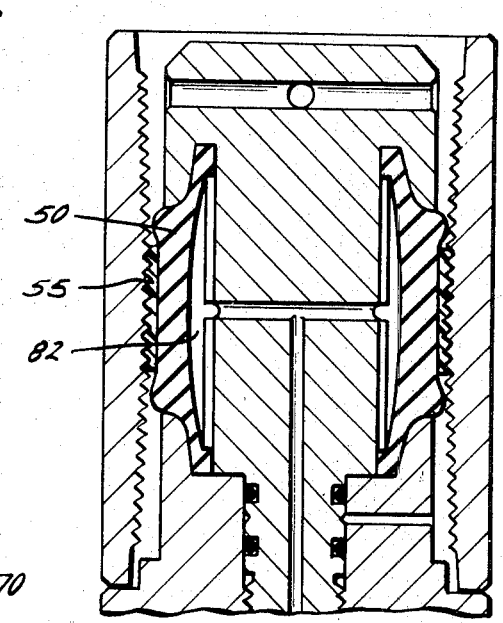
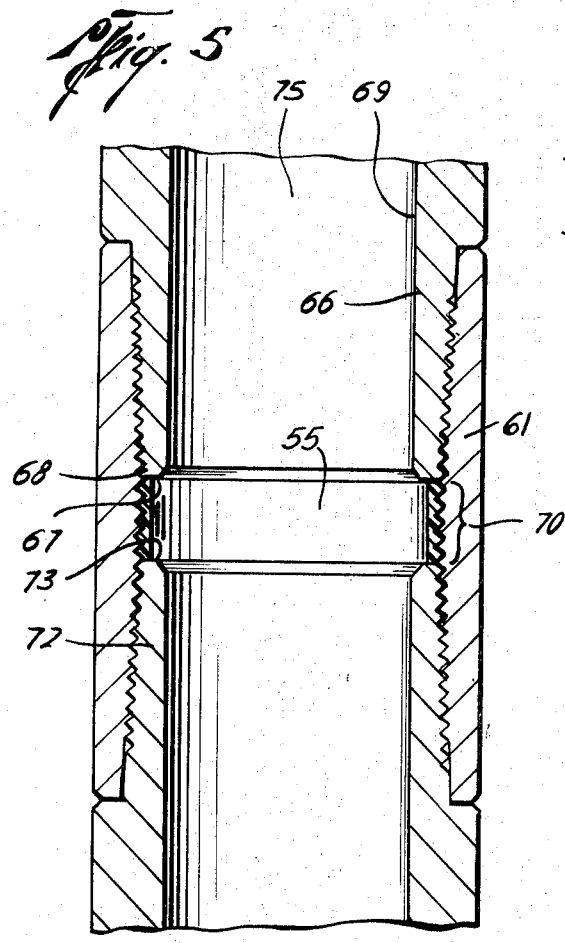
Barnard P. Goodman
INVENTOR
BY Arnold, Roylance, Kruger & Durkee
ATTORNEYS – # United States Patent Office 3,528,868
Patented Sept. 15, 1970

3,528,868
METHOD FOR COATING THE STANDOFF AREA OF A THREADED COUPLING
Barnard P. Goodman, Houston, Tex., assignor to American Machine & Foundry Company, New York, N.Y., a corporation of New Jersey
Filed Feb. 13, 1967, Ser. No. 615,545
Int. Cl. B32b 31/04
U.S. Cl. 156—294                    11 Claims

ABSTRACT OF THE DISCLOSURE

A method for bonding a thin plastic ring to the threaded interior surface of a pipe coupling comprises applying an adhesive to the exterior surface of the ring, placing the ring over an expandable rubber sleeve, centering the coupling over the ring, and expanding the rubber sleeve to bond the ring to the coupling.

---

This invention relates to the coating of internally threaded couplings, such as those couplings used to secure together two sections or "joints" of coated pipe. More specifically the invention relates to the provision of an effective coating seal in the area of the coupling which is left uncovered when a coated pipe string is made up and a pipe joint is threaded into each end of the coupling.

The invention has special applicability and utility in the contexts of use wherein corrosive fluids are transported great distances through a number of coated pipe joints, each of which is connected to another pipe joint by a coupling. In these contexts for use, for example in the oil and gas industry, there have been two overriding problems. The first is provision of a coating material which is resistant, under the temperature and pressure conditions under which it is used, to the fluids, for example oil, flowing through the pipe. The second is the bonding of that material to the coupling in such a manner that there is no interference with the "makeup" of the coated pipe string. By "makeup" is meant the joining together of the coated pipe joint to the coupling to form an integral, fluid-tight coated pipe string. This is customarily accomplished by the provision of a threaded pipe end and a coupling having mating threads, and simply rotating the two pieces into threaded engagement. It is readily seen that, if the threads of the coupling are coated, it may become difficult or even impossible to thread the coated pipe end into the coupling, and even if it can be done it might tear the coating from the coupling and/or the coated pipe end, to thus render one or both of these coatings ineffective.

The area of the coupling of interest is that part of the coupling which is not covered by either of the internally-coated pipe joints which, when the pipe string is madeup, are threaded into the coupling a certain distance. That is, the area of concern is that area between the two coated pipe joints. This area is commonly referred to as the "standoff" area.

No prior art method or apparatus is suitable for solving both these problems which have been plaguing the industry for a great many years. Rapid advances have been made in the coating arts, but in this area it is readily recognized that if there is an ineffective coating in any one area of a long pipe string, it is that area where corrosion will first occur and the complete string will be rendered inoperative while the necessary repair or replacement made. In other words, the ineffectively coated coupling in a long string of coated pipe is the weakest link in the chain. When it is considered that pipe strings as used in wells for example, may be miles long and may require a great many days and a great expense to remove and replace; and that each hour of shut-down may result in the loss of a great many dollars, the severity of the overall problem is realized.

It is thus seen that it is of utmost importance that an effective corrosion-resistant coating be provided to the internal surface of a coupling in the "standoff" area, and that such a coating be provided which will not interfere with makeup of the pipe string. It is also of utmost importance, of course, that such a coating be provided in a manner which is economically practical.

The present invention provides method and apparatus for obtaining such a coating, and the method and apparatus are efficient, economical of use, and rapid. The coating material provided is oil-resistant and resistant to other corrosive materials, and the application to the coating is accomplished in a manner such that not only is the makeup of the coated pipe string not interfered with, it is indeed facilitated.

In order that the present invention may be readily understood, reference is made to the accompanying drawings which form a part of this specification and which illustrate one embodiment of the invention wherein:

FIG. 3 is a fragmentary view similar to FIG. 2, showing the apparatus with a coupling therearound, at another step in such method;

FIG. 4 is a view similar to FIG. 3, at a later step in such method; and

FIG. 5 is a sectional view of a coupling with pipe joints therein, the standoff area of the coupling having been effectively coated in accordance with one embodiment of this invention.

Figure 1:
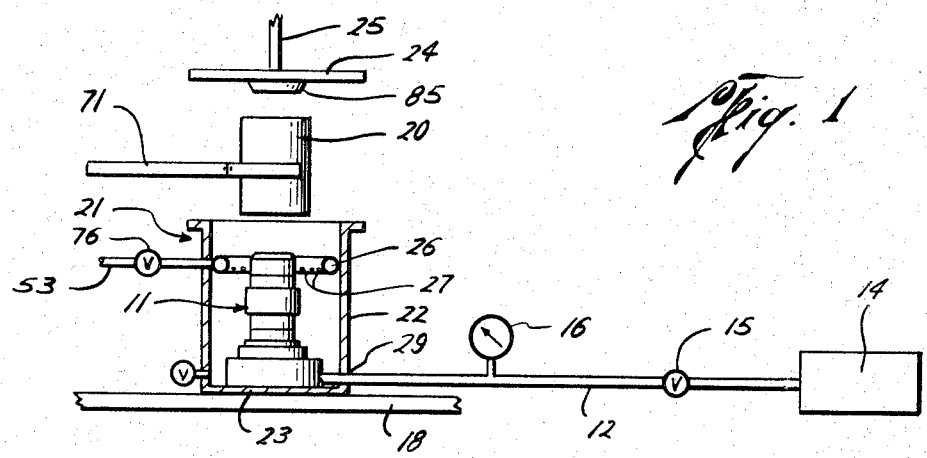
FIG. 1 is a pictorial view of apparatus according to one embodiment of this invention.

Referring now in more detail to the drawings, there is schematically illustrated in FIG. 1 apparatus useful in accordance with one embodiment of the present invention. This apparatus, which may be automatically controlled and operated, comprises generally a tool 11 into the interior of which hydraulic fluid may enter from a pressurized fluid source such as the tank 14 by means of a fluid line 12. Suitable flow control means, such as the valve 15, and measuring means, such as the pressure gauge 16, may be included along the line 12 intermediate the fluid source 14 and the tool 11.

A coupling 20 to be coated in accordance with the invention is seen to be positioned above the tool 11, the coupling being held in this instance by tongs 71.

In the illustrated embodiment, the tool 11 is seen to be positioned in a generally cylindrical container 21 which includes tubular side portion 22, base portion 23 and top portion 24. The top 24 is detachable from the remainder of the container 21, and may for example be raised and lowered by a rod 25 which may be hydraulically actuated and automatically controlled. Suitable means may be included in the container 21 for quenching apparatus and materials located inside the container; such means may desirably include a spray tube 26 which is generally circular in overall configuration and is positioned against the interior surface of the side portion 22 of the container. Spray tube 26 includes holes 27 for emitting a fluid spray, and is of course in fluid communication with a suitable source of fluid supply, as for example the water line 53, in which line is desirably included flow control means such as the valve 76. Container 21 is seen to be positioned in this embodiment on a table 18.

Proximate to the tool 11 is suitable means for heating a coupling according to one step in a method of this invention; such means may conveniently comprise for example an oven (not shown).

Fluid supply line 12 enters the container 21 by way of a suitable opening 29 in the side wall 22 of the container; likewise, water line 53 communicates through a suitable opening in the side wall 22.

Figure 2:
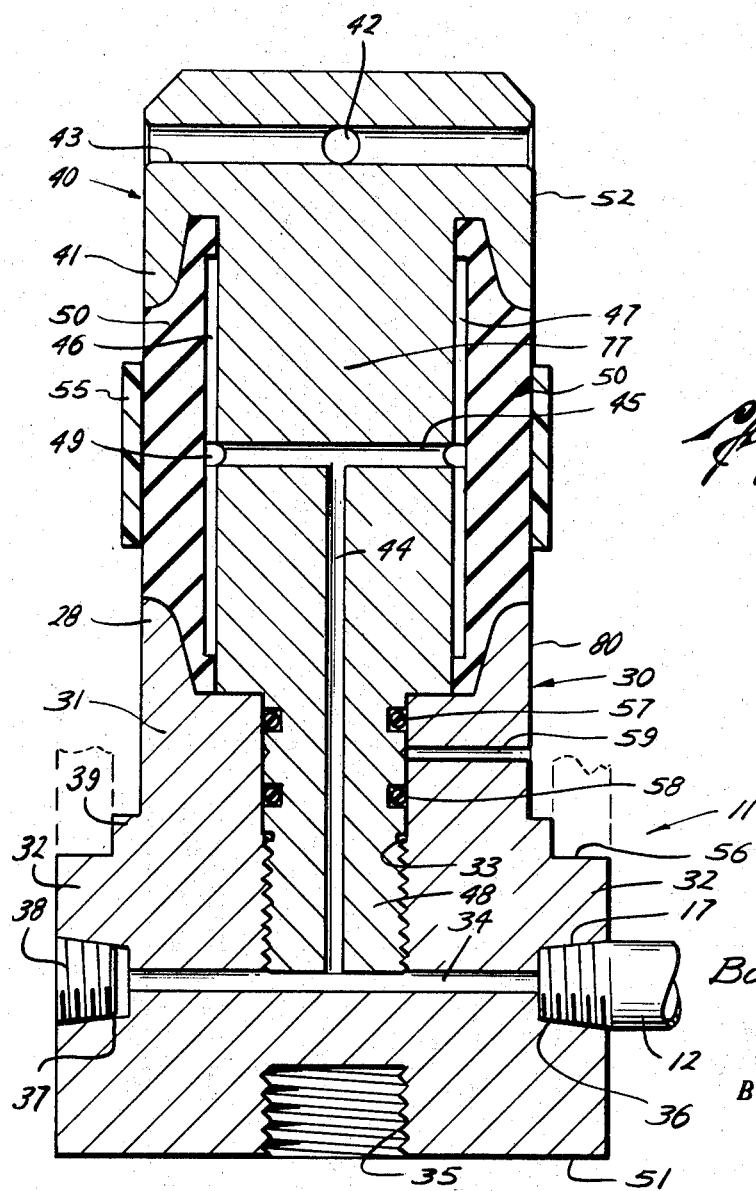
FIG. 2 is a vertical sectional view of a portion of the apparatus illustrated in FIG. 1, at one step in a method according to this invention.

Turning now to FIG. 2, the tool 11 is illustrated in greater detail. The tool is seen to comprise generally a base portion 30 and a head portion 40.

Base portion 30 is seen to comprise generally a substantially cylindrical mandrel 31, presenting a cylindrical exterior surface in a region 80, below which is flanged portion 32 of larger diameter. At the upper end of region 80 opposite flanged portion 32 is an annular ear 28. Between the region 80 and the flanged portion 32 is a step 39, which presents a horizontal (in the FIG. 2 orientation) annular surface 56. It is upon this surface that a coupling to be coated is adapted to rest, as seen in the dotted lines in FIG. 2. The surface 56 together with the step 39 constitute centering means to retain the coupling being treated in a perfectly centered position.

The bottom surface 51 of the base 30 is flat for fitting flush against a table or other suitable surface, or against the inside of bottom 23 of the container 21. Fixation of the tool to the container or other support may be accomplished for example by means of a threaded recess 35 in the bottom surface 51, into which may be threadedly connected a screw from a stand or support; or the container base 23 may have a threaded member which mates with the recess 35.

A couple of threaded recesses 36 and 37 are included in flanged portion 32 of the base 30, conveniently one on either side of the base, 180° disposed. These recesses are connected by a lateral bore 34 which traverses the center of the base 30. The recesses 36 and 37 are convenient for receiving matingly shaped connectors. For example, the threaded end portion 17 of fluid supply line 12 is seen to be threadedly connected to the recess 36. Recess 37 is also convenient for receiving a supply line if it is desired to supply fluid through that side of the tool. In this instance, however, it is seen that the recess 37 is plugged by means of a threaded plug 38.

Longitudinally through the middle of the base 30, upwardly from lateral bore 34, extends a threaded relatively large central bore 33 of a size and configuration adapted to receive a threaded extension 48 of head portion 40.

The head 40 is also generally cylindrical in configuration. The head terminates at its lower end in the threaded extension 48, and near its upper end includes a region 52 of diameter essentially equal to the diameter of region 80 of base 30. At the bottom of region 52 is an annular ear 41 which is similarly shaped to the annular ear 28 on the base 30, but is oppositely oriented so that a region is formed between the ears 41 and 28 convenient for receipt of a sleeve 50. Intermediate the upper end of the head 40 and the threaded extension 48 at the lower end thereof, is a region 77 of cylindrical configuration, and of a diameter less than the diameter of the region 52 but greater than the diameter of the extension 48. It is the exterior of the head in this region which presents the surface on which the sleeve 50 may fit.

Holes 42 and 43, which extend through the head 40 near its upper end in region 52, are disposed at a right angle to each other and are convenient for receipt of a bar wrench which may be used to affix the head into the base 30.

Extending along the central longitudinal axis of the head 40, from a point approximately equidistant between the ears 28 and 41 when the tool is in its assembled position illustrated in FIG. 2, to the bottom end of the head, is a central bore 44. The bore 44 is adapted to provide fluid communication at its lower end with the lateral bore 34 in base 30, and terminates at its upper end in a lateral bore 45. The bore 45 communicates with the exterior surface of the head 40 in region 77. Also conveniently included around the outer surface of head 40 at this point is a circular groove 49 which completely encircles the head 40 in region 77, such groove being in the same horizontal plane as the lateral bore 45. Also located on the exterior surface of the head 40 in the region 77 are a couple of longitudinal grooves 46 and 47, one on each side of the head surface. These grooves 46 and 47 communicate with each the lateral bore 45 and the circular groove 49, and receive fluid from these channels. It is noted that the grooves 46 and 47 each terminate at each end of region 77 a distance spaced from the end of that portion of the head 40.

Around the threaded extension 48 of the head 40 are located a couple of longitudinally spaced recesses convenient for the receipt of a pair of spaced O-ring seals, 57 and 58. The portion intermediate these sealing means communicates with a relief hole 59 in the base 30. Relief hole 59 is adapted to carry any fluid which may be present between the O-rings 57 and 58 to the exterior of the tool 11.

Into the region 77 of the head 40 intermediate the ears 28 and 41 is adapted to fit a resilient sleeve 50. The sleeve 50 is constructed of a size and configuration suitable for fitting into this area between ears 41 and 28 (i.e., annular in horizontal cross-section and somewhat trapezoidal in vertical cross-section) with a nonexpanded outside diameter substantially equal to the outside diameter of the region 52 of head 40 and region 80 of base 30. Ring 55 is illustrated in centered position over the sleeve 50, the sleeve being shown in FIG. 2 in a nonexpanded position.

The annular resilient member or sleeve 50 may be constructed of any suitable material, for example silicone rubber or any other elastomer which is capable of withstanding the temperatures and pressures to which the apparatus must be subjected. It is desirable to construct the sleeve so that it will have a length dimension slightly greater than the longitudinal distance between the ears 28 and 41, and an inside diameter slightly smaller than the diameter of the outside surface of region 77 around which the sleeve fits. This is to assure that the sleeve will completely fit under compression the total area between ears 41 and 28, and will leave no space in this area unoccupied, forming an effective seal to prevent the escape of hydraulic fluid. The outside diameter of the sleeve should be substantially equal to the diameter of the ring 55. In one embodiment of the invention (not specifically illustrated) a neoprene sleeve with a silicone rubber oversleeve is employed, since neoprene tends to wear out rapidly when subjected to constant temperatures on the order of 400–500° F. But it is emphasized that the sleeve 50 may be of any suitable material.

The method of operation in accordance with the invention can be best understood by reference to FIGS. 3 and 4, as well as FIGS. 1 and 2.

In accordance with one embodiment of the method of the invention the length of the "standoff" area 70, FIG. 5, desired is determined for the coupling to be coated. Of course, this determination need not be precise, because a ring of greater length than such area must be employed anyway. But it is convenient to know generally what is the area to be coated.

A ring 55 of suitable synthetic polymeric material is provided which is approximately 15 to 30 mils in thickness and, in length, slightly longer than the standoff area as thus determined. The thickness of the ring is critical since insufficient thickness will result in inadequate coverage of the threads and hence inadequate protection. Too great a thickness will result in interference with makeup of the coated pipe, even if a lubricating polymer is used. It has been found that 15 to 30 mils is a satisfactory thickness and that, for use in many contexts, a ring thickness of 20 to 25 mils is preferred.

Although the ring 55 may be of any suitable synthetic polymeric material, the fluorinated hydrocarbon polymer "Teflon" has been found to be especially desirable, for the reasons that this material provides lubricity so that it does not interfere with makeup of the pipe into the coupling [as a matter of fact, it has been found to *aid* makeup], and it provides excellent corrosion inhibition in the hydrocarbon environment in which a great many such couplings are used. It has been found that, for best results, fluorinated ethylene propylene polymer or "FEP" type Teflon is superior to tetrafluoroethylene polymer or "TFE" type Teflon. This material is available from the E. I. du Pont de Nemours Co. of Wilmington, Del.

The Teflon ring thus provided is etched to render it bondable to the coupling, as by treating the ring with sodium metal in a suitable solvent such as anhydrous ammonia. This method of rendering Teflon bondable is conventional and quite well known in the art. Alternatively, "FEP" Teflon with a Type C surface preparation may be employed. This material, available from Du Pont, requires no further surface treatment.

An adhesive is then applied, as by brushing or spraying, onto the exterior of the Teflon ring. In this connection, a dry adhesive is preferred in most instances to a wet adhesive, for the reason that it is much easier to work with and is in many instances more effective. A suitable dry adhesive system may be prepared in the following manner:

Into solution "A" with 36 grams of methyl ethyl ketone are placed 374 grams of EPI REZ 2287, an epoxy resin of Celanese Co., and 15 grams of EPI REZ 5155, also an epoxy resin of the Celanese Co.

Into solution "B" in 10 grams of dimethyl formamide are placed 1 gram of dicyandiamide, a curing agent, and 0.05 gram benzyldimethylamine.

Solutions A and B are blended together in a blender with 8.5 grams Cabosil, a fumed silica thickener of Cabot Corp.

The Teflon ring 55, when dry, is then slipped over the head 40 of tool 11, into the position illustrated in FIG. 2, so that the ring is in engagement with the sleeve and the midpoint of the ring 55 approximately coincides with the midpoint of the sleeve 50. A visual inspection will usually serve the purpose on the centering of the ring 55 in this manner; since the ring 55 is of a length greater than the coupling's "standoff" area, it will not generally be critical if the ring is very slightly off longitudinal center. More precise centering of the ring may be accomplished if desired by constructing the sleeve 50 so that it has a slight projection on which the lowermost part of ring 55 may fit.

A coupling 20, having ends 62 and 63, exterior surface 61, and a threaded interior surface which is tapered towards ends 62 and 63 from an enlarged central part 64 (see FIG. 3), which has been preheated to a temperature of approximately 400–500° F. (as for example in a nearby oven), is then placed in position on the tool 11 as illustrated in FIG. 2. The placement of the coupling onto the tool 11 may be done by means of tongs 71, or alternatively, the operator wearing gloves may take the coupling in hand and transfer it onto the tool. Or of course any other suitable means of transfer may be used.

The step 39 cooperating with the annular surface 56 and the cylindrical side walls of the head 40, base 30, and sleeve 50, serve to center the coupling on the tool and provide for application of the Teflon ring 55 in exactly the correct position, so that the ring is adjacent the standoff area, is approximately equidistant from the coupling around the entire periphery of ring and coupling, and the midpoint of the ring is approximately aligned with the midpoint of the standoff area. This positioning is of course important for proper operation of the method and apparatus. Also aiding in the centering of the coupling in this embodiment is the frustro-conical extension 85 on the top cover 24.

The top cover 24 of container 21 is then closed tightly, and hydraulic fluid under pressure is introduced into the tool 11. The valve 15 may be opened to permit fluid to enter the fluid line 12 from the source of fluid under pressure 14. With a pressure of about 500 p.s.i., which may be gauged by reading the measuring means such as pressure gauge 16, the resilient sleeve 50 expands substantially uniformly into the position illustrated in FIG. 4, wherein the ring is moved into engagement with the heated coupling. This is effected by the action of the hydraulic fluid, which enters the lateral bore 34, thence central bore 44 and lateral bore 45, under pressure, and then occupies an area 82 adjacent the outer surface in region 77 of head 40, bulging the sleeve outwardly as seen in FIG. 4. In this expanded position, the Teflon ring with adhesive on the exterior thereof moves into contact with the hot coupling 20. At this instant, the ring is firmly bonded to the internal surface of the coupling in the central part 64 thereof, covering the standoff area 70. It has been found that good results may be obtained with an application time of approximately one minute when the coupling has been preheated to a temperature of 400–500° F. During this period, the adhesive is transferred into the plastic state, and gives a good bond between Teflon ring and coupling. The Teflon ring 55 thus becomes firmly bonded to the interior surface of the threaded coupling.

Cool water is then introduced into the spray tube 26, flowing under pressure out through holes 27 to quench the coupling 20 which now has Teflon ring 55 bound securely thereto. The quenching cools the coupling, and returns the adhesive to the solid state. The pressure is then released, whereupon the hydraulic fluid recedes from the area 82 by means of the grooves 46, 47 and 49, back into the supply line 12 by way of bores 45, 44, and 34. Top cover 24 is then withdrawn and the coupling is removed from the container.

The complete method detailed above can be performed in a period of about one or two minutes.

A coupling 61 coated in the manner detailed above is seen in FIG. 5. Here it is seen that the Teflon ring 55 covers an area slightly greater than the standoff area 70 between the ends 67 and 73 of pins 66 and 72, respectively. The Teflon ring covers the threads 68, but it has been found that the covering of the threads in this manner does not interfere with makeup of the pins 66 and 72 into the coupling. Rather, it has been found that the Teflon coating actually facilitates makeup. As fluid flows through the interior channel 75 formed by the inside surface of pin 66, standoff area 70 of coupling 21, and pin 72, the Teflon coating prevents the coupling 21 from being corroded by the fluid.

It is seen that method and apparatus has been provided which afford protection against corrosion for the standoff area of a coupling, aid makeup by lubricating the makeup action, are useful in an oil and chemical environment, and do all this in an economical and rapidly performed fashion.

In this application, terms such as "upper," "lower," "top," "bottom," "horizontal," and "vertical," have been used with reference to the orientation of elements shown in the drawings. Such terms should not be construed as limiting in any manner as other orientations of the apparatus are also possible, but are included only for illustrative and explanatory purposes.

What is claimed is:

1. A method for coating the standoff area of a threaded coupling comprising:
   determining the length of the standoff area;
   providing a ring of corrosion-resistant synthetic polymeric material about 15 to about 30 mils in thickness and slightly greater in length than said standoff area;
   applying an adhesive to the exterior surface of said ring;
   providing a tool having an annular resilient member adapted for being expanded upon application of pressure thereto, said annular member having a diameter substantially equal to the diameter of said ring:

placing said ring over said resilient member in engagement therewith;

heating said coupling to a temperature sufficient for effectively bonding said ring to said coupling;

centering said coupling over said ring so that said standoff area is adjacent said ring, and is approximately equidistant from said ring around the entire periphery thereof;

expanding said resilient annular member to substantially uniformly move said ring into engagement with said heated coupling, whereupon said ring is bonded to said coupling; and cooling said coupling and withdrawing said coupling from said tool;

whereby said coupling is suitable for use in corrosive environments and makeup of coated pipe joints with the coupling may be achieved without difficulty or tearing of the coating.

2. A method for coating a coupling in accordance with claim 1, wherein said synthetic polymeric material is a fluorinated hydrocarbon polymer.

3. A method for coating a coupling in accordance with claim 2, wherein said ring is etched to render it bondable to said coupling.

4. A method for coating a coupling in accordance with claim 1, wherein said ring is approximately 20 to 25 mils in thickness.

5. The method for coating a coupling in accordance with claim 1, wherein said adhesive is applied to the ring in the plastic state but is permitted to harden before the ring is moved into engagement with the coupling.

6. A method for coating a coupling in accordance with claim 1, wherein said coupling is preheated to a temperature of about 400° to about 500° F.

7. A method for coating a coupling in accordance with claim 1, wherein said centering of said coupling over said ring includes aligning the midpoint of said ring with the midpoint of said standoff area.

8. A method for coating a coupling in accordance with claim 1, wherein said resilient sleeve is expanded by means of introduction of hydraulic fluid into the interior of said tool, whereby said fluid occupies an area underneath said sleeve, forcing said sleeve outwardly toward said coupling.

9. A method for coating a coupling in accordance with claim 8, wherein said hydraulic fluid is introduced into said tool at a pressure of about 500 p.s.i.

10. A method for coating a coupling in accordance with claim 1, wherein said cooling includes quenching said coupling with cool water.

11. A method for coating the standoff area of a threaded coupling comprising:

determining the length of the standoff area;

providing a ring of fluorinated hydrocarbon polymer about 15 to about 30 mils in thickness, and slightly greater than the length of the standoff area in length;

applying an adhesive to the exterior surface of said ring;

providing a tool having a generally cylindrical surface upon which an annular resilient member having a diameter approximately equal to the diameter of said ring is adapted to fit, and channels for the communication of hydraulic fluid to said surface, whereby the introduction of hydraulic fluid under pressure will expand said annular resilient member;

placing said ring over said resilient member in engagement therewith;

heating said coupling to a temperature of about 400° to about 500° F.;

centering said coupling over said ring so that said ring is adjacent said stand-off area, is approximately equidistant from said coupling around the entire periphery thereof, and the midpoint of said ring is approximately aligned with the midpoint of said stand-off area;

introducing hydraulic fluid under pressure into said tool so as to expand said annular member substantially uniformally around the periphery thereof to move said member outwardly, thereby moving said ring into engagement with said heated coupling in the stand-off area thereof, whereupon said ring is bonded to said coupling in said stand-off area;

cooling said coupling; and withdrawing said coupling from said tool, whereby said coupling is suitable for use in corrosive environments and makeup of coated pipe joints with the coupling may be achieved without difficulty or tearing of the coating.

References Cited

UNITED STATES PATENTS

| | | | |
|---|---|---|---|
| 3,192,612 | 7/1965 | Elliott et al. | 29—157 |
| 3,202,562 | 8/1965 | Lang et al. | 156—294 |
| 3,307,996 | 3/1967 | Keneipp. | |

REUBEN EPSTEIN, Primary Examiner

U.S. Cl. X.R.

156—98, 293; 279—2